(12) United States Patent
Tsai

(10) Patent No.: US 9,165,608 B2
(45) Date of Patent: Oct. 20, 2015

(54) HARD DISK SECURING STRUCTURE FOR AN INDUSTRIAL COMPUTER AND TRAY THEREOF

(71) Applicant: AIC INC., Taoyuan Hsien (TW)

(72) Inventor: Lin-Kuei Tsai, Taoyuan Hsien (TW)

(73) Assignee: AIC INC., Taoyuan (TW)

( * ) Notice: Subject to any disclaimer, the term of this patent is extended or adjusted under 35 U.S.C. 154(b) by 275 days.

(21) Appl. No.: 13/900,274

(22) Filed: May 22, 2013

(65) Prior Publication Data

US 2014/0346298 A1 Nov. 27, 2014

(51) Int. Cl.
*G06F 1/16* (2006.01)
*G11B 33/12* (2006.01)
*G06F 1/18* (2006.01)
*H05K 5/00* (2006.01)
*H05K 7/00* (2006.01)

(52) U.S. Cl.
CPC .............. *G11B 33/124* (2013.01); *G06F 1/181* (2013.01); *G06F 1/183* (2013.01); *G06F 1/184* (2013.01); *G06F 1/185* (2013.01); *G06F 1/186* (2013.01); *G06F 1/187* (2013.01)

(58) Field of Classification Search
CPC ......... G06F 1/187; G06F 1/183; G06F 1/184; G06F 1/185; G06F 1/186; G06F 1/181
USPC ............ 361/679.01, 679.02, 679.31, 679.32, 361/679.33, 679.34, 679.35, 679.36, 361/679.37, 679.38, 679.39, 679.4, 679.41, 361/679.43, 679.44, 679.45, 679.57, 361/679.58, 728, 730, 731, 732, 752, 753, 361/754, 755, 756, 759
See application file for complete search history.

(56) References Cited

U.S. PATENT DOCUMENTS 5,455,746 A * 10/1995 Sato et al. ..................... 361/816

* cited by examiner

*Primary Examiner* — Hoa C Nguyen
*Assistant Examiner* — Binh Tran
(74) *Attorney, Agent, or Firm* — Chun-Ming Shih; HDLS IPR Services

(57) ABSTRACT

A hard disk securing structure for an industrial computer is disclosed. The industrial computer includes a case, the hard disk securing structure is served to accommodate a hard disk and includes a securing member and a tray. The securing member is installed in the case and includes a buckling unit; the tray is installed in the case and includes a carrying plate and a pair of lateral plates respectively extended from two ends of the carrying plate, an accommodation space used for accommodating the hard disk is defined by the carrying plate and the pair of lateral plates, a locking unit is extended from one end of the carrying plate which is adjacent to the pair of the lateral plates, and the locking unit is mutually locked with the buckling unit. Accordingly, an advantage of easily installing/detaching the hard disk from the case is achieved.

11 Claims, 7 Drawing Sheets

HARD DISK SECURING STRUCTURE FOR AN INDUSTRIAL COMPUTER AND TRAY THEREOF

BACKGROUND OF THE INVENTION

1. Field of the Invention

The present invention relates to an industrial computer, especially to a hard disk securing structure for an industrial computer and a tray thereof.

2. Description of Related Art

An industrial computer is installed with at least a storage hard disk used for storing data, and the storage hard disk is often secured on a tray by screws, then the tray is secured in a case of the industrial computer by screws, so the storage hard disk is enabled to be stably secured in the industrial computer.

However, because the tray is secured in the case of the industrial computer by utilizing screws, a disadvantage of time consuming would be caused when the tray is installed/detached.

SUMMARY OF THE INVENTION

The present invention is to provide a hard disk securing structure for an industrial computer, wherein a buckling unit and a locking unit are mutually locked thereby achieving an advantage of easily installing/detaching a hard disk from a case.

Accordingly, the present invention provides a hard disk securing structure for an industrial computer, the industrial computer includes a case, the hard disk securing structure is served to accommodate a hard disk, the hard disk securing structure includes a securing member and a tray; the securing member installed in the case and includes at least a buckling unit; the tray is installed in the case and includes a carrying plate and a pair of lateral plates respectively extended from two ends of the carrying plate, an accommodation space used for accommodating the hard disk is defined by the carrying plate and the pair of lateral plates, at least a locking unit is extended from one end of the carrying plate which is adjacent to the pair of the lateral plates, and the locking unit is mutually locked with the buckling unit.

Accordingly, the present invention provides a tray of a hard disk securing structure which is used for accommodating a hard disk, the tray includes a carrying plate and a pair of lateral plates respectively extended from two ends of the carrying plate, an accommodation space used for accommodating the hard disk is defined by the carrying plate and the pair of lateral plates, two corresponding ends of the carrying plate are respectively extended with at least a locking unit and at least a fasten pin, the locking unit and the fasten pin are respectively disposed between the pair of lateral plates, the locking unit is formed with a through hole, and the fasten pin is formed with a fasten slot.

The advantages achieved by the present invention are as follows: a latch segment of an elastic sheet is latched in a securing hole of the securing member and a hook of the securing member is fastened in the fasten slot of the fasten pin, thereby enhancing the securing strength between the tray and the case and preventing the tray from being separated from the case due to external forces; and a convex column of an elastic arms is mounted with a recessed slot of the hard disk, an effect of securing the hard disk in the accommodation space of the tray is achieved, and an advantage of easily installing/detaching the hard disk from the tray is also achieved, thereby reducing the time required for installing/detaching.

DETAILED DESCRIPTION OF THE INVENTION

A preferred embodiment of the present invention will be described with reference to the drawings.

Figure 1:
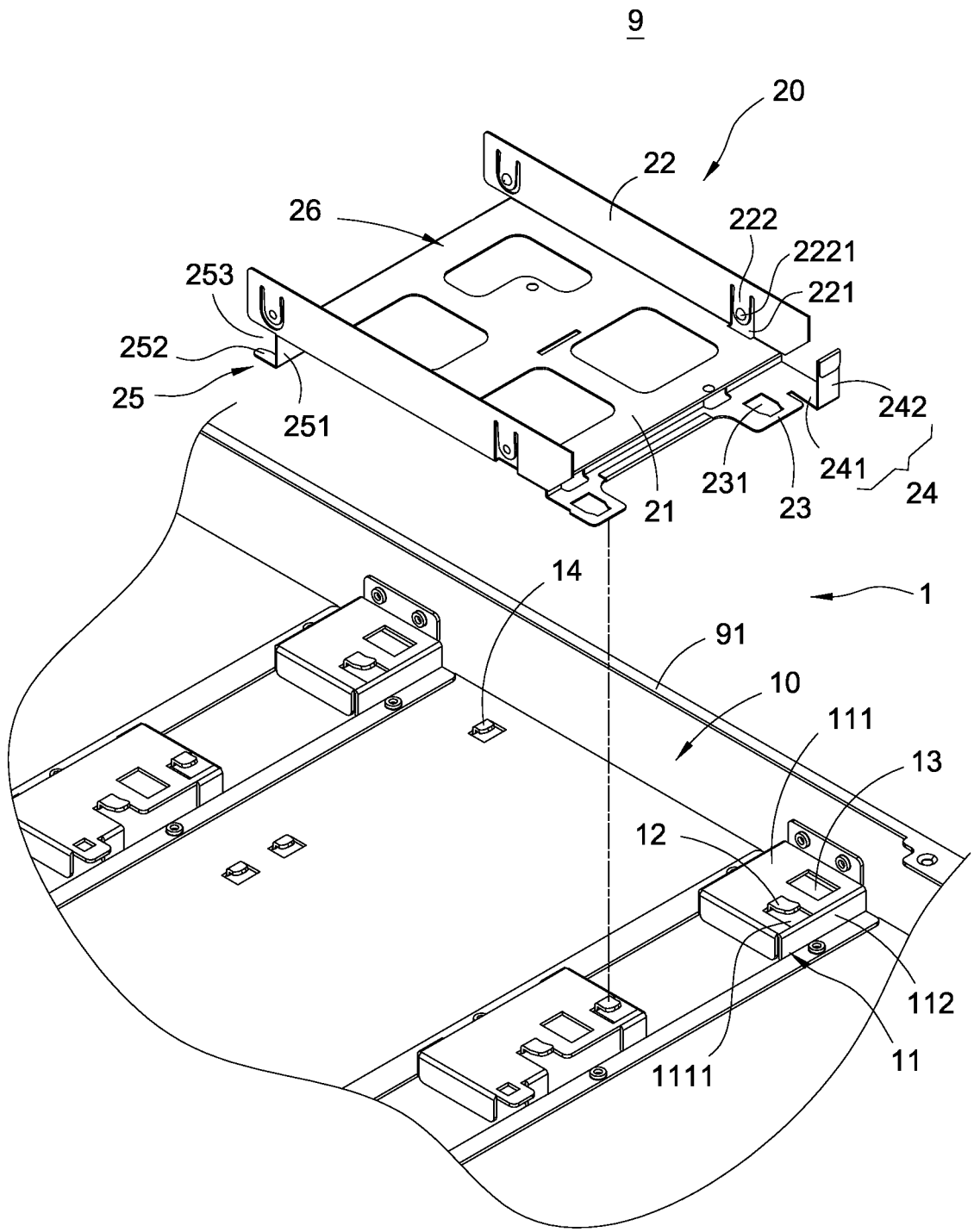
FIG. 1 a perspective exploded view according to the present invention.
Figure 2:
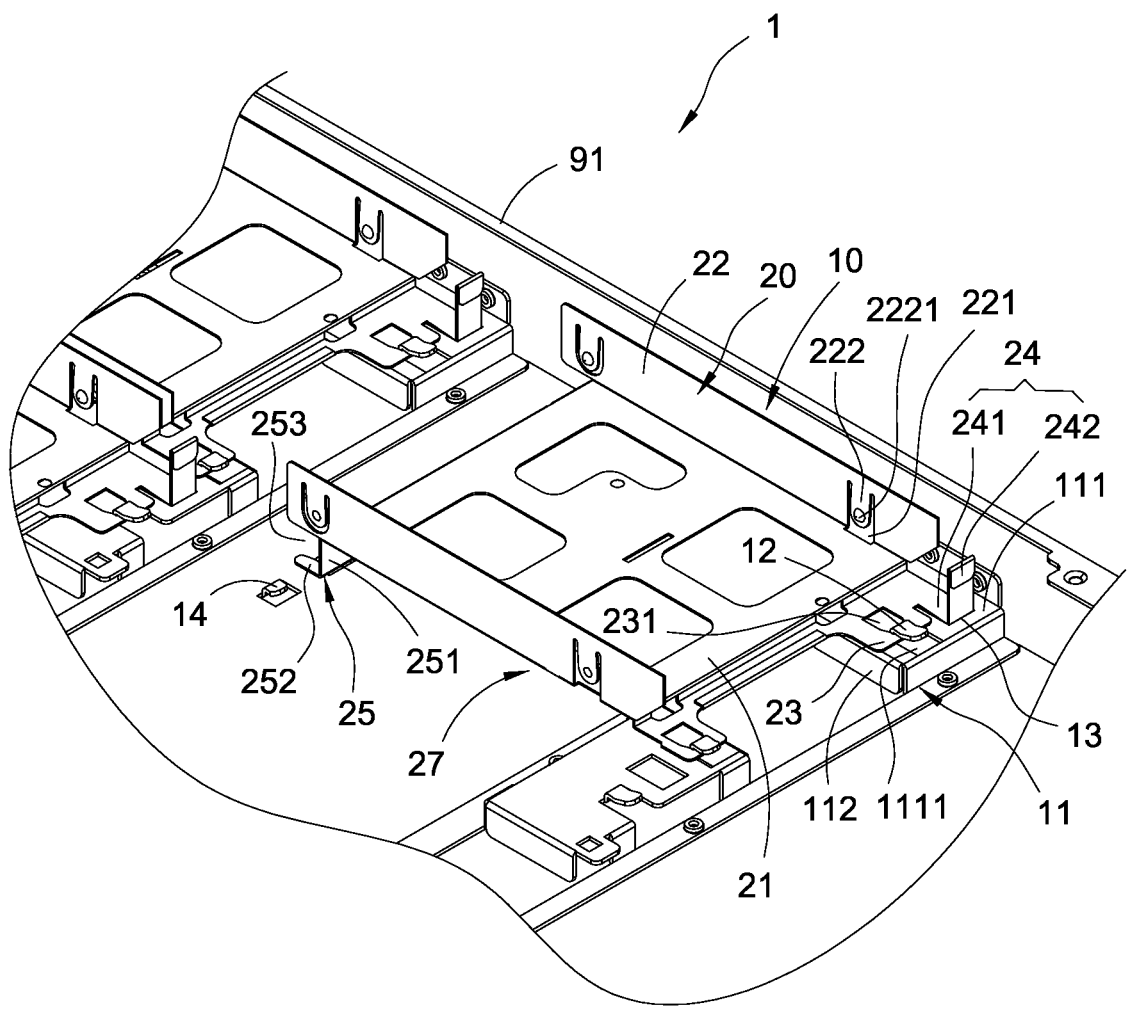
FIG. 2 a perspective view showing the assembly according to the present invention.
Figure 3:
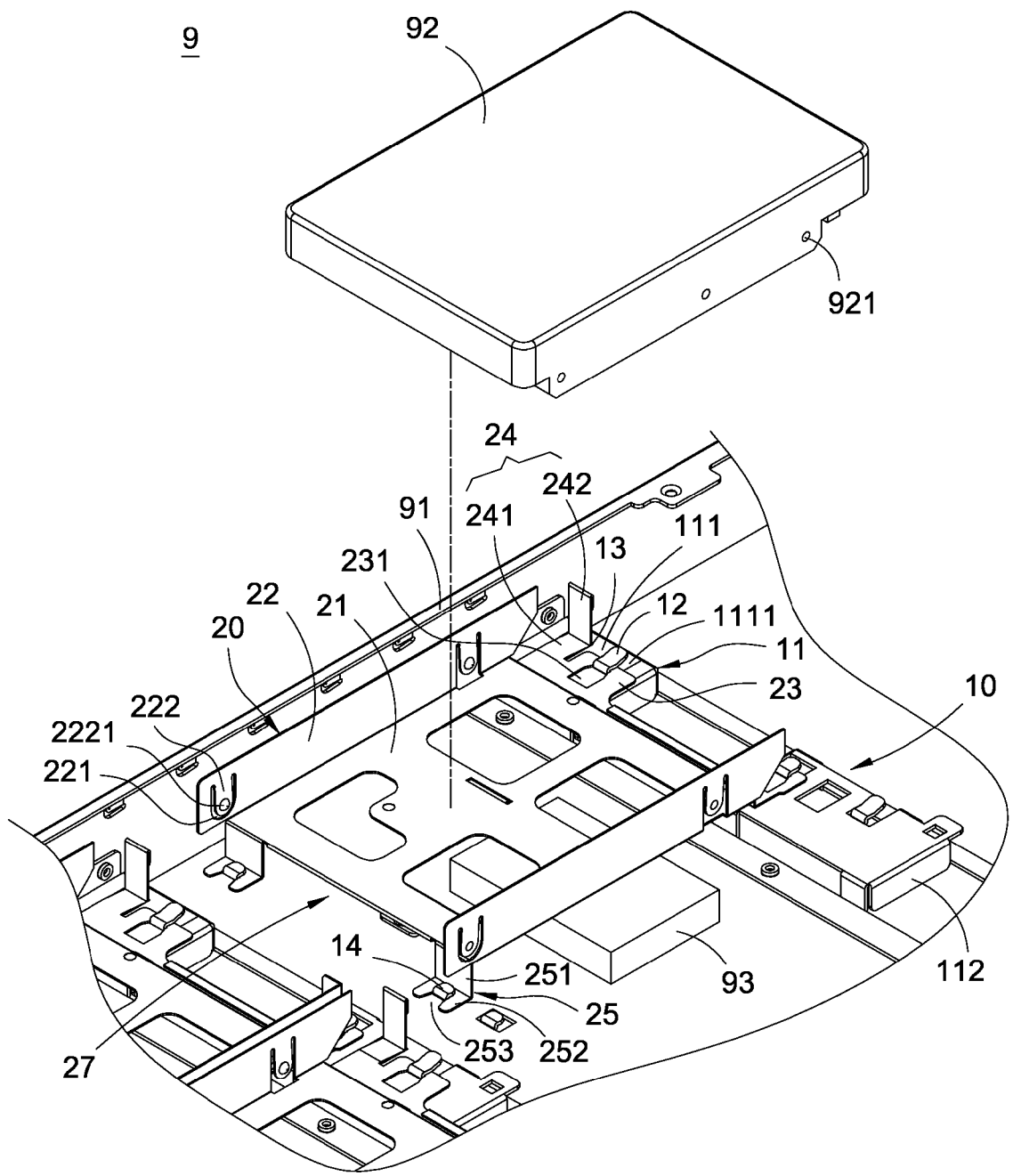
FIG. 3 a perspective view according to the present invention.

Please refer from FIG. 1 to FIG. 3, wherein FIG. 1 is a perspective exploded view according to the present invention; FIG. 2 is a perspective view showing the assembly according to the present invention; and FIG. 3 is a perspective view according to the present invention. The present invention provides a hard disk securing structure 1 for an industrial computer 9, which mainly includes a securing member 10 and a tray 20.

The industrial computer 9 includes a case 91, the hard disk securing structure 1 is served to accommodate a hard disk 92, two lateral surfaces of the hard disk 92 are respectively formed with a recessed slot 921, and the hard disk 92 is a storage hard disk.

The securing member 10 is installed in the case 91 and includes a protrusion part 11, at least a buckling unit 12, at least a securing hole 13 and at least a hook 14. The protrusion part 11 includes a substrate 111 and at least two vertical plates 112, each of the vertical plates 112 is respectively extended from one end of the substrate 111, and the end of each of the vertical plates 112 away from the substrate 111 is connected to an inner surface of the case 91. The substrate 111 is formed with an open hole 1111. The buckling unit 12 is formed as a reversed hook, and extended from the periphery of the open hole 1111 of the substrate 111 towards a direction away from the substrate 111 and bent for the purpose of formation. When the quantity of the protrusion part 11 is plural, the protrusion parts 11 are arranged at intervals. The securing hole 13 is formed on the substrate 111, and arranged at the side of the substrate 111 where the open hole 1111 is formed. The hook 14 is formed through being extended from the inner surface of the case 91.

The tray 20 is installed in the case 91, and includes a carrying plate 21, a pair of lateral plates 22, at least a locking unit 23, plural elastic sheets 24 and at least a fasten pin 25.

The pair of lateral plates 22 are extended from two corresponding ends of the carrying plate 21, and an accommodation space 26 used for accommodating the hard disk 92 is defined by the carrying plate 21 and the pair of lateral plates 22. Each of the lateral plates 22 is formed with an open slot 221, and each of the lateral plates 22 is extended with an elastic arm 222 along the periphery of the open slot 221, each of the elastic arms 222 is disposed in the accommodation space 26 of the tray 20, one lateral surface of each of the elastic arms 222 which is away from the corresponding lateral plate 22 is formed with a convex column 2221, and each of the convex columns 2221 is mounted in the recessed slot 921 of the hard disk 92.

The locking unit 23 is a lug extended from one end of the carrying plate 21, the locking unit 23 is disposed between the pair of lateral plates 22, and the locking unit 23 is formed with a through hole 231 allowing the buckling unit 12 to be locked; when the quantity of the locking unit 23 is plural, the locking units 23 are arranged at intervals, and the installing location of each of the locking units 23 is corresponding to each of the protrusion parts 11.

The elastic sheet 24 is extended from one end of the carrying plate 21 and disposed between the lateral plate 22 and the locking unit 23, the elastic sheet 24 is formed in a L-like shape and includes a latch segment 241 and a free segment 242 extended from the latch segment 241, and the latch segment 241 is latched in the securing hole 13 of the securing member 10.

The fasten pin 25 includes a support segment 251 and a fasten segment 252, the support segment 251 is extended from one end of the carrying plate 21 which is away from the locking unit 23, the fasten segment 252 is extended from the support segment 251, the fasten pin 25 is disposed between the pair of lateral plates 22, the fasten segment 252 is formed with a fasten slot 253, and the hook 14 is latched and fastened in the fasten slot 253 of the fasten pin 25; a partition space 27 used for accommodating an operation hard disk 93 of the industrial computer 9 is defined by the carrying plate 21, the vertical plate 112 of the protrusion part 11 which is close to the hook 14, the fasten segment 252 and the case 91.

Figure 4:
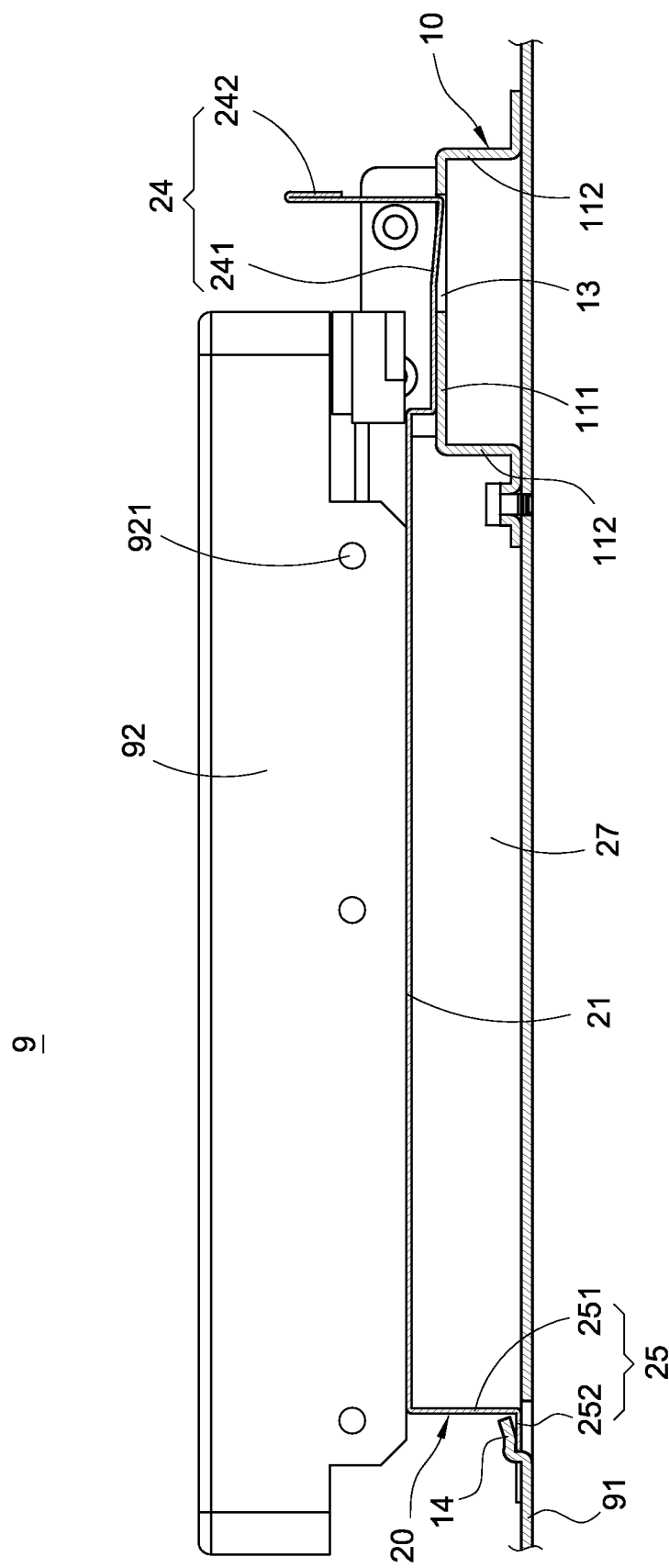
FIG. 4 is a schematic view illustrating the operation of the present invention.
Figure 5:
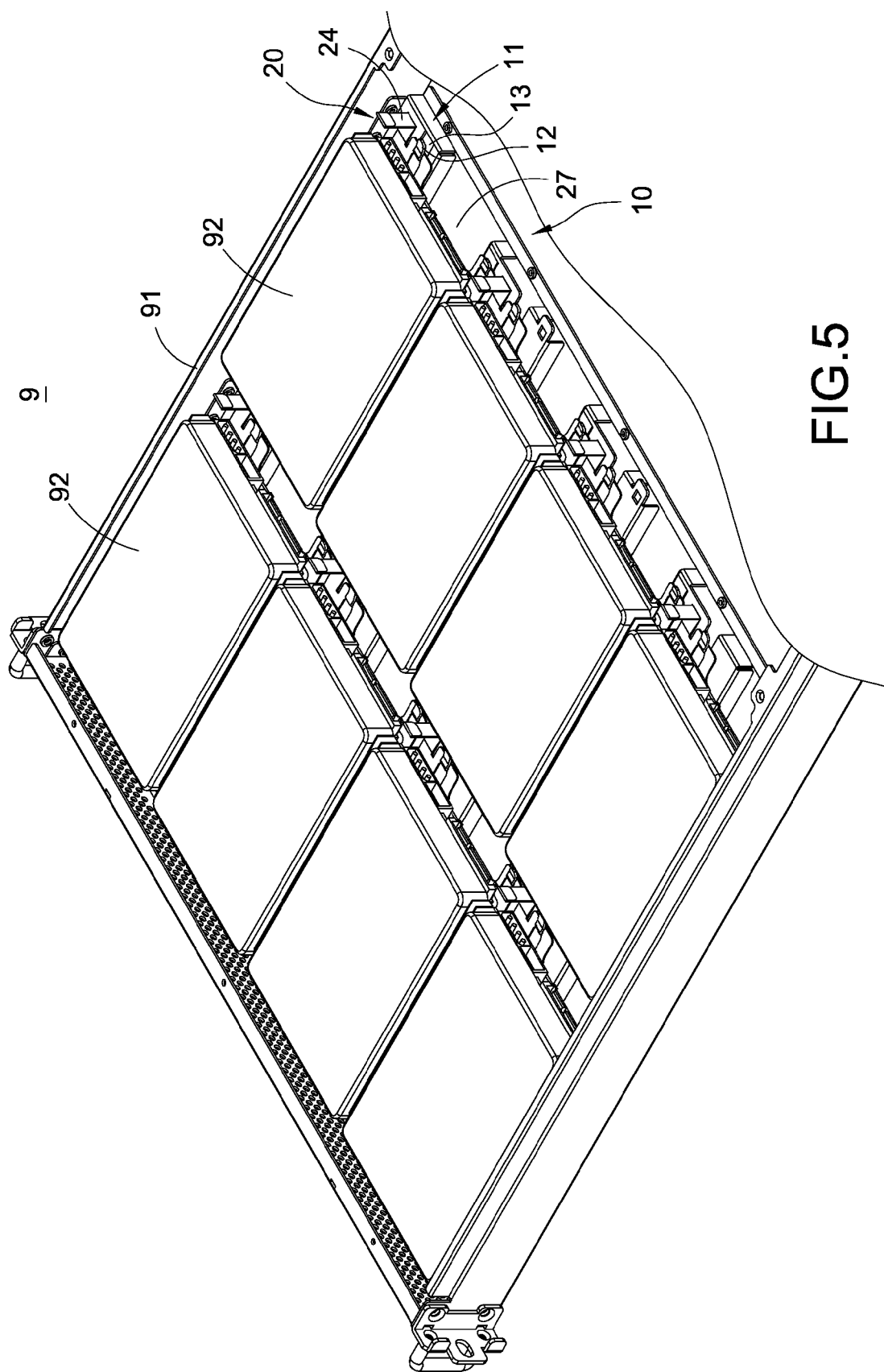
FIG. 5 is another schematic view illustrating the operation of the present invention.

Please refer to FIG. 4 and FIG. 5, wherein FIG. 4 is a schematic view illustrating the operation of the present invention; and FIG. 5 is another schematic view illustrating the operation of the present invention. When the present invention is in operation, the hard disk 92 is accommodated in the accommodation space 26 of the tray 20, then one side of the tray 20 is disposed on the substrate 111 of the protrusion part 11, the buckling unit 12 is buckled and locked in the through hole 231 of the locking unit 23, thereby enabling the tray 20 to be easily secured in the case 91 so as to achieve the advantage of easy installation. Moreover, through the latch segment 241 of the elastic sheet 24 being latched in the securing hole 13 of the securing member 10 and the hook 14 of the securing member 10 being fastened in the fasten slot 253 of the fasten pin 25, the tray 20 is enabled to be more stably secured in the case 91, thereby enhancing the securing strength between the tray 20 and the case 91 and preventing the tray 20 from being separated from the case 91 due to external forces.

Figure 6:
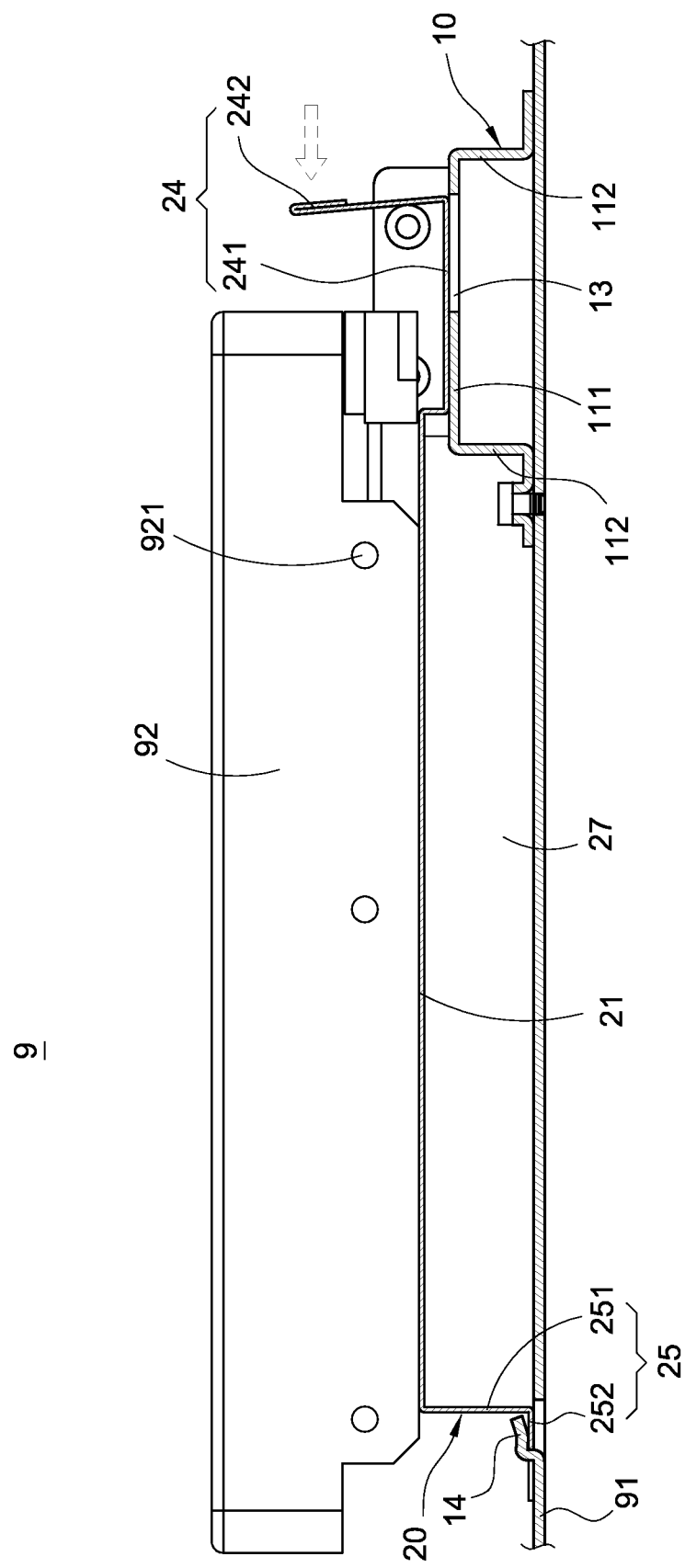
FIG. 6 is one another schematic view illustrating the operation of the present invention.
Figure 7:
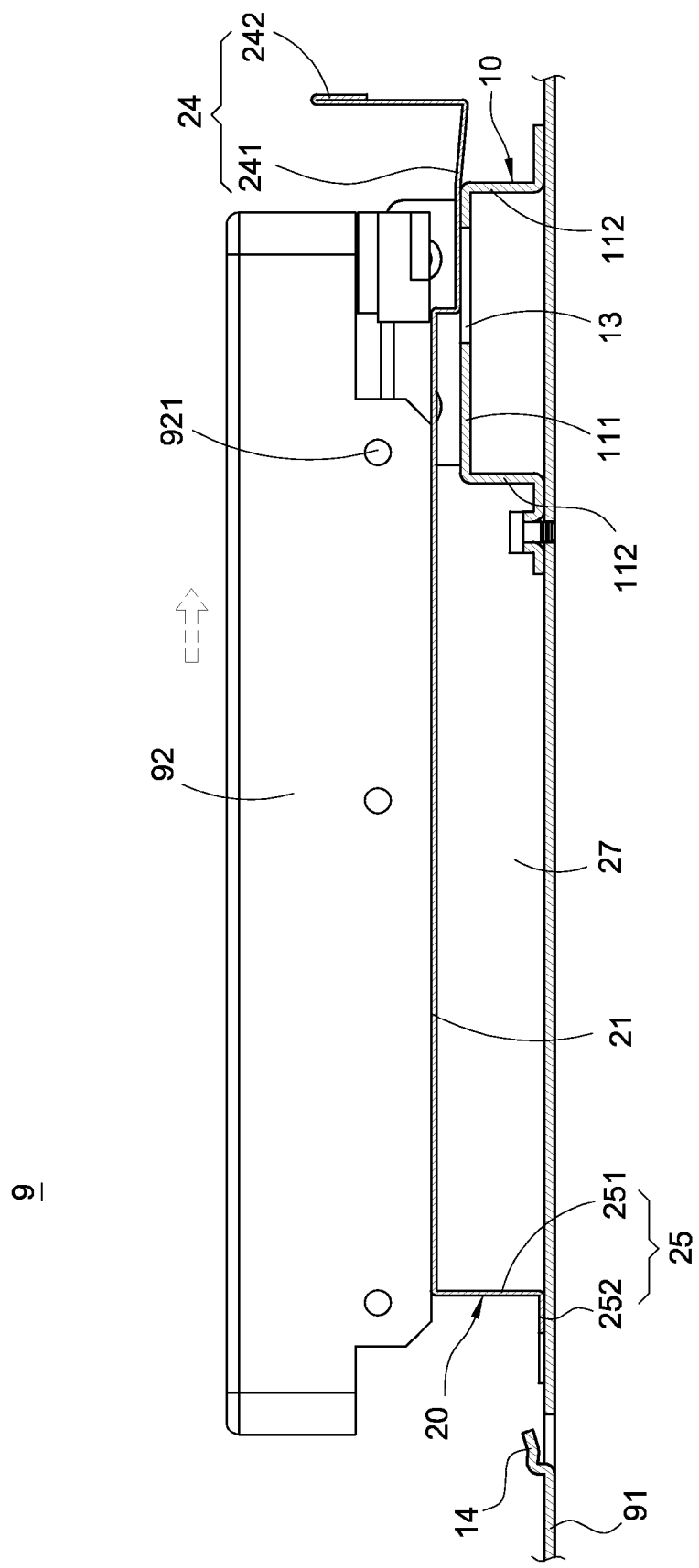
FIG. 7 is still one another schematic view illustrating the operation of the present invention.

Please refer to FIG. 6 and FIG. 7, wherein FIG. 6 is one another schematic view illustrating the operation of the present invention; and FIG. 7 is still one another schematic view illustrating the operation of the present invention. When the tray 20 is desired to be detached from the case 91, an action force is applied to the free segment 242 of the elastic sheet 24 for moving the free segment 242 towards the tray 20, so the latch segment 241 is linked for being released from the securing hole 13; then an action force is applied to the tray 20 for moving the tray 20 towards the protrusion part 11, so the fasten segment 252 of the fasten pin 25 is released from the hook 14; lastly, the locking unit 23 is removed from the buckling unit 12, thereby allowing the tray 20 to be easily detached so as to achieve an advantage of easily installing/detaching the hard disk 92 in the case 91.

Moreover, through the convex column 2221 of each of the elastic arms 222 being mounted with each of the recessed slots 921 of the hard disk 92, an effect of securing the hard disk 92 in the accommodation space 25 of the tray 20 is achieved, and an advantage of easily installing/detaching the hard disk 92 from the tray 20 is also achieved, thereby reducing the time required for installing/detaching.

Furthermore, the operation hard disk 93 is accommodated in the partition space 27 defined by the carrying plate 21, the protrusion part 11, the fasten segment 252 and the case 91 thereby achieving an advantage of saving space.

As what has been disclosed above, the hard disk securing structure for an industrial computer and the tray thereof provided by the present invention is applicable in industries, and complies with the elements of novelty and non-obviousness, and the structure disclosed by the present invention is never seen in the market nor used in public.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A hard disk securing structure for an industrial computer, wherein the industrial computer includes a case, and the hard disk securing structure is served to accommodate a hard disk, the hard disk securing structure comprising:
    a securing member, installed in the case and including at least a buckling unit; and
    a tray, installed in the case and including a carrying plate and a pair of lateral plates respectively extended from two ends of the carrying plate, an accommodation space used for accommodating the hard disk being defined by the carrying plate and the pair of lateral plates, at least a locking unit being extended from one end of the carrying plate which is adjacent to the pair of the lateral plates, the locking unit being mutually locked with the buckling unit,
    wherein the securing member includes at least a protrusion part, the buckling unit is a reversed hook formed on the protrusion part, the locking unit is a lug, and the locking unit is formed with a through hole allowing the buckling unit to be locked;
    wherein the protrusion part includes a substrate and at least two vertical plates respectively extended from one end of the substrate, one end of each vertical plate away from the substrate is connected to an inner surface of the case, and the buckling unit is extended from the substrate.

2. The hard disk securing structure for an industrial computer according to claim 1, wherein the substrate is formed with an open hole, and the buckling unit is extended from the periphery of the open hole and bent for the purpose of formation.

3. The hard disk securing structure for an industrial computer according to claim 1, wherein the quantity of the protrusion part and the quantity of the locking unit are plural, and each of the protrusion parts and each of the locking units are arranged at intervals.

4. The hard disk securing structure for an industrial computer according to claim 1, wherein the tray further includes an elastic sheet, the elastic sheet is extended from one end of the carrying plate and disposed between the locking unit and the lateral plate, the securing member further includes a securing hole formed on the substrate, and the elastic sheet is latched in the securing hole.

5. The hard disk securing structure for an industrial computer according to claim 1, wherein the tray further includes at least a fasten pin, the fast pin is extended from one end of the carrying plate which is away from the locking unit, the fasten pin is disposed between the pair of lateral plates, and the securing member further includes at least a hook extended from the inner surface of the case and allowing the fasten pin to be fastened.

6. The hard disk securing structure for an industrial computer according to claim 5, wherein the fasten pin includes a support segment extended from one end of the carrying plate and a fasten segment extended from the support segment, the fasten segment is formed with a fasten slot, the hook is latched and fastened in the fasten slot, and a partition space is defined by the carrying plate, the vertical plate close to the hook, the fasten segment and the case.

7. The hard disk securing structure for an industrial computer according to claim 6, wherein a partition space is defined by the carrying plate, the vertical plate close to the hook, the fasten segment and the case.

8. The hard disk securing structure for an industrial computer according to claim 1, wherein the lateral plate is formed with at least an open slot, the lateral plate is extended with at least an elastic arm along the periphery of the open slot, the elastic arm is disposed in the accommodation space, one lateral surface of the elastic arm which is away from the lateral plate is formed with a convex column, one lateral surface of the hard disk is formed with at least a recessed slot, and the convex column is mounted in the recessed slot.

9. A tray of a hard disk securing structure, which is used for accommodating a hard disk, wherein the tray includes a carrying plate and a pair of lateral plates respectively extended from two ends of the carrying plate, an accommodation space used for accommodating the hard disk is defined by the carrying plate and the pair of lateral plates, two corresponding ends of the carrying plate are respectively extended with at least a locking unit and at least a fasten pin, the locking unit and the fasten pin are respectively disposed between the pair of lateral plates, the locking unit is formed with a through hole, and the fasten pin is formed with a fasten slot, wherein the fasten pin includes a support segment extended from one end of the carrying plate and a fasten segment extended from the support segment, and the fasten segment is formed with a fasten slot;

wherein the carrying plate is extended with an elastic sheet at one end which is between the pair of lateral plates, and the elastic sheet is disposed at one side of the locking unit.

10. The tray of a hard disk securing structure according to claim 9, wherein the quantity of the locking unit is plural, and each of the locking units is arranged at intervals.

11. A tray of a hard disk securing structure, which is used for accommodating a hard disk, wherein the tray includes a carrying plate and a pair of lateral plates respectively extended from two ends of the carrying plate, an accommodation space used for accommodating the hard disk is defined by the carrying plate and the pair of lateral plates, two corresponding ends of the carrying plate are respectively extended with at least a locking unit and at least a fasten pin, the locking unit and the fasten pin are respectively disposed between the pair of lateral plates, the locking unit is formed with a through hole, and the fasten pin is formed with a fasten slot, wherein the lateral plate is formed with an open slot, the lateral plate is extended with an elastic arm along the periphery of the open slot, the elastic arm is disposed in the accommodation space, one lateral surface of the elastic arm which is away from the lateral plate is formed with a convex column, one lateral surface of the hard disk is formed with a recessed slot, and the convex column is mounted in the recessed slot.

\* \* \* \* \*